UNITED STATES PATENT OFFICE.

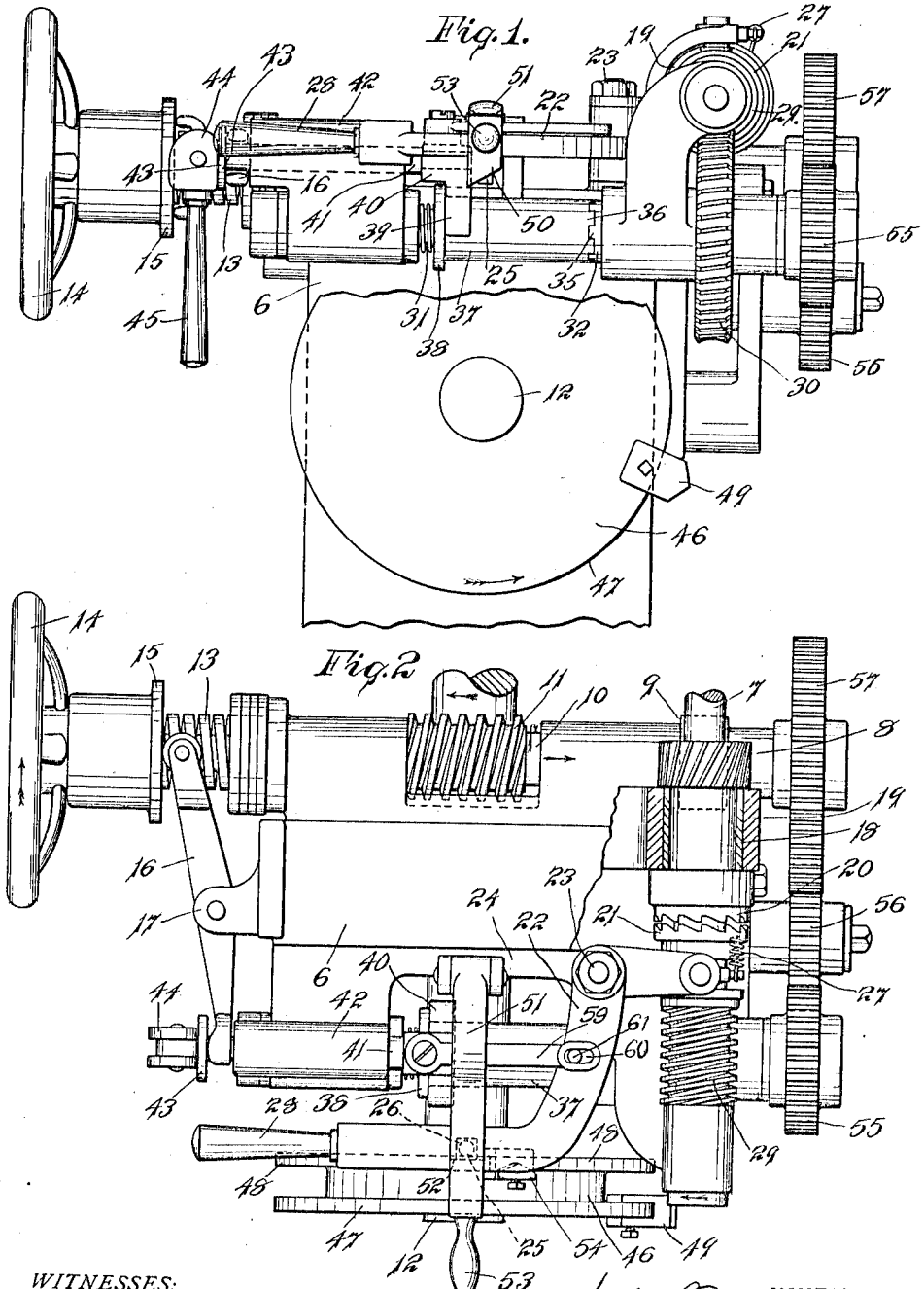

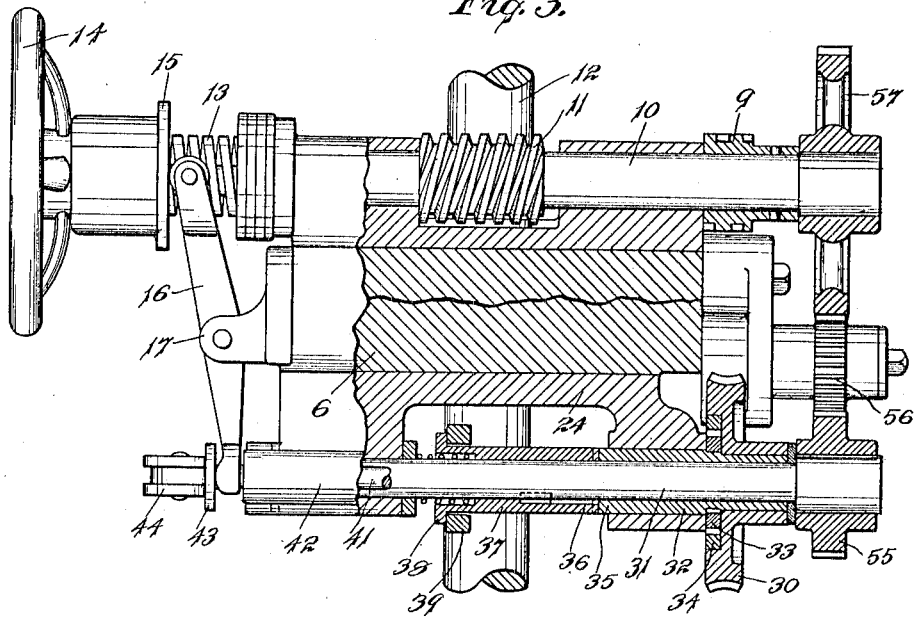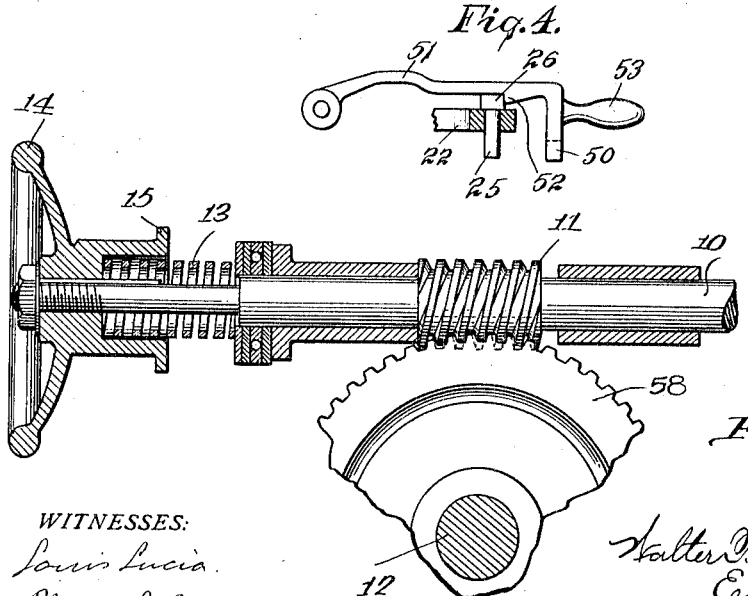

WALTER B. PEARSON, OF CHICAGO, ILLINOIS, AND ERNEST R. SEWARD, OF MADISON, WISCONSIN; SAID SEWARD ASSIGNOR TO THE HARTFORD MACHINE SCREW COMPANY, OF HARTFORD, CONNECTICUT, A CORPORATION OF CONNECTICUT.

TRANSMISSION MECHANISM.

1,084,818.  Specification of Letters Patent.  Patented Jan. 20, 1914.

Application filed February 11, 1913. Serial No. 747,790.

*To all whom it may concern:*

Be it known that we, WALTER B. PEARSON, of Chicago, in the county of Cook and State of Illinois, and ERNEST R. SEWARD, recently of Hartford, in the county of Hartford and State of Connecticut, but now residing at Madison, in the county of Dane and State of Wisconsin, both citizens of the United States, have invented a new and Improved Transmission Mechanism, of which the following is a specification.

Our invention relates more especially to that class of machines for automatically forming metallic articles of various description, and an object of our invention, among others, is to produce a machine of this class that shall be extremely rapid and effective in its operation, and accurate as to the character of work produced.

One form of machine embodying our invention, and in the construction and use of which the objects hereinabove set out, as well as others, may be attained, is illustrated in the accompanying drawings in which—
Figure 1 is a view in end elevation of a portion of a machine embodying our invention, with parts broken away to show the construction. Fig. 2 is a top view of the same with parts broken away to show construction. Fig. 3 is a view partially in horizontal section through the machine on two planes, one passing through the axis of the cam shaft driver and the other passing through the axis of the slow speed shaft.
Fig. 4 is a detail view showing the connection between the change speed clutch lever and the clutch holding lever. Fig. 5 is a detail view illustrating the connection between the cam shaft driver and the cam shaft.

In the accompanying drawings the numeral 6 denotes the frame of the machine, constructed of any suitable material and properly formed to receive and support the various parts of the mechanism making up the machine as a whole. A driving shaft 7 extends lengthwise of the machine from end to end (one end only of the machine and of this driving shaft being shown herein), being mounted in suitable bearings and driven in any suitable manner, as by means of a pulley or like device secured to the shaft at the end not shown.

A helical gear 8 is mounted on the shaft 7, to rotate independently thereof, this gear meshing with a helical gear 9 keyed to a shaft 10 constituting a cam shaft driver that has a worm 11 meshing with a worm wheel 58 upon a cam shaft 12 that, in machines of this type, is employed for driving various parts of the mechanism. In the operation of the machine it is desirable that this cam shaft shall travel at different speeds, as a slow speed when the tools are operating upon, or cutting a piece of work, and at a much faster speed when the tools are idle, as when different parts are being moved to proper position for further operations, and in order to make the rapidity of the operation most effective it is essential that the change from one speed to another shall be effected without delay and in the quickest possible manner, the mechanism herein shown and described being particularly efficient in securing these results. In this mechanism, including the parts above described, the shaft 10 is permitted a limited lengthwise movement against the tension of a spring 13 that holds the shaft and the worm 11 in its normal position of operation. A hand wheel 14, used for manual movement of the machine when desired, has a hub with a flange 15 against which rollers mounted in the arms of a forked stop motion lever 16 normally rest, this lever being mounted between ears 17 extending from the side of the frame of the machine.

The helical gear 8 has a sleeve 18 mounted in the bearing 19 of the frame, with a clutch member 20 secured to the sleeve. This clutch member is preferably of the toothed kind, the teeth of which are formed to mesh with the teeth of a sliding clutch member 21 splined on the shaft 7. This sliding clutch member is engaged in a suitable manner by the forked end of a change speed clutch lever 22, pivotally mounted on a post 23, rising from a bracket 24 secured to the end of the machine. This lever has a cam stud 25 projecting from its under side and a retaining stud 26 projecting from its upper side, and a spring 27 secured at one end to the lever and at its opposite end to the frame of the machine, normally forces the clutch members 20, 21 into engagement. The lever 22 may have a handle 28 for purpose of manual operation, if desired.

A slow speed worm 29, secured to the shaft 7, meshes with a slow speed worm wheel 30 rotatably mounted on the slow speed shaft 31 mounted in the bracket 24. In the form of construction herein shown, this worm wheel is mounted on a bushing 32 supported on the shaft and having secured thereto a ratchet 33 engaged by a pawl 34, pivotally mounted on the worm wheel and by means of which the sleeve is driven. The end of this sleeve is provided with teeth forming one member 35 of a stop motion clutch, the other member 36 of which is formed on the end of a stop motion sleeve 37 slidably mounted on the shaft 31 and having a flange 38 arranged for engagement with the forks 39 of a stop motion block 40 secured to a stop motion rod 41, longitudinally movable in a bearing 42 on the bracket 24. This rod supports a collar 43 and is flattened at its end for reception between the ears 44 of a hand lever 45, pivotally attached to the bar. The end of the stop motion lever 16 rests against the collar 43, which engagement causes the bar to be moved by the operation of the stop motion lever to disconnect parts and stop operation of the tools.

A cam support 46 having cam receiving flanges 47, 48 is secured to the cam shaft 12, and a cam 49 secured to the flange 47 striking a cam block 50 on the under side of a clutch holding lever 51, raises the lever and disengages a stop shoulder 52 from the retaining stud 26, and releases the change speed clutch lever 22 and permits engagement of the clutch members 20, 21 under the pull of the spring 27. The clutch holding lever 51 is pivotally mounted upon the bracket 24 and has a handle 53 by means of which it may be manually operated when desired.

A cam 54 secured to the receiving flange 48, operates upon the cam stud 25 on the lever 22 to move said lever on its pivot and disengage the clutch parts 20, 21 against the force of the spring 27. The lever 22 is moved sufficiently by the cam to permit engagement of the shoulder 52 with the retaining stud 26, whereby the clutch parts are held disengaged until the lever 51 is disengaged from the stud 26 by the cam 49.

A pinion 55 secured to the slow speed shaft 31, meshes with a direction pinion 56 mounted on a stud projecting from the frame of the machine, the pinion 56 meshing with a gear 57 secured to the cam shaft driver 10, this direction pinion being for the purpose of imparting movement to the gear 57 in the proper direction.

A bar 59 is secured to the upper edge of the fork 39 and has a slot 60 engaging a pin 61 projecting from the lever 22. This construction will cause the clutch members 20—21 to be disengaged by the movement of the lever 16 and the fork 39 should such clutch parts be in engagement, but should they be disengaged, as shown in Fig. 2, then the movement of the fork 39 to disengage the clutch members 35—36 will not affect the clutch members 20—21.

The operation of the device is as follows: The parts being in the position shown in the drawings, the cam shaft 12 is rotated at slow speed, and tool cutting operation is being performed. The driving connection from the driving shaft 7 is through the slow speed worm and worm wheel 29 and 30, pawl and ratchet 34, 33, clutch members 35, 36, slow speed shaft 31, pinions and gear 55, 56 and 57, driver 10, worm 11 to the worm wheel 58 on the cam shaft 12. The helical gears 8, 9 and clutch members 20, 21 are, during this operation, rotating idly. Should, during this operation, any of the cutting tools meet with undue resistance, or excess force be exerted upon any of the parts connected with the cam shaft or operated thereby, this force will necessarily be transmitted to the worm 11, that, in its effort to overcome such force is moved against the tension of the spring 13, moving the shaft or driver 10 and operating the lever 16 to disconnect the stop clutch members 35, 36 through the medium of the stop motion rod 41 and fork 39. This same operation may be effected by means of the handle 45 when desired. Means may be provided for adjusting the tension of the spring 13, which tension will be such as to resist power upon the worm 11 to an extent to permit practical operation of the tools, the tension of the spring, however, being such that it will yield to undue force upon the parts. When a tool cutting operation has ceased, the cam 49 immediately acts upon the clutch holding lever 51, disengaging it from the change speed clutch lever 22 and permitting the clutch members 20, 21 to engage under the force of the spring 27. The cam shaft now will be driven from the driving shaft 7, through the clutch member 21, secured to the shaft, clutch member 20, helical gears 8, 9, driver 10, and thence through the worm 11 as before. In this operation there is a direct drive from the shaft 7 to the cam shaft 12 but the slow speed worm wheel 30 travels at the same rate as before, while the slow speed shaft is traveling at a faster rate which, however, is permitted by the ratchet and pawl (33—34—) connection between said shaft and worm wheel. With the parts in this position, as hereinabove described, should excess force occur upon the shaft 10, and the lever 16 thereby be operated, the lever 22 through the medium of the fork 39 and bar 59, will also be operated to disengage the clutch parts 20—21 and thus stop the operation of the machine.

The handles 28 and 53 may be made use of for manual operation of the change speed clutch member 22 and clutch holding lever 51 when desired.

While we have shown and described herein a satisfactory construction of mechanism for performing the results desired, this mechanism may be changed to a greater or lesser degree and yet be within the spirit and intent of the invention.

We claim:

1. A variable speed driving mechanism, including a driving shaft and a driven shaft, a connection between said shafts for driving the latter at a certain speed, said connection including a connecting and disconnecting clutch, a connection between said shafts for rotating the driven shaft at a different rate of speed, said connection including a connecting and disconnecting clutch independent of that above mentioned, a clutch operating member, a connection between said clutch operating member and both of said clutches, and means to operate one of said clutches independently of the other by means of said clutch operating member.

2. In a driving mechanism, a driving shaft, a driven shaft, a gear connection between said shafts, including a gear movable relatively to its intermeshing gear, means for yieldingly resisting the movement of said gear, a clutch included in said connection, and clutch operating mechanism connected to be operated by said gear when it is moved relatively to its intermeshing gear.

3. In a driving mechanism, a driving shaft, a driven shaft, a gear connection between said shafts, including a gear movable in an axial direction, means for yieldingly resisting the movement of said gear in an axial direction, a clutch included in said connection, and clutch operating mechanism connected to be operated by the movement of said gear in an axial direction.

4. In a driving mechanism, a driving shaft, a driven shaft, a gear connection between said shafts and including a shaft movable longitudinally and supporting one of said gears, means for yieldingly resisting the longitudinal movement of said shaft, a clutch included in said connection, and a lever connected with said clutch to operate it, and also connected with and to be operated by said shaft in its longitudinal movement.

5. In a driving mechanism, a driving shaft, a driven shaft, a connection between said shafts including a worm meshing with a worm wheel, said worm being arranged to move in an axial direction, means for yieldingly resisting said axial movement, a clutch included in said connection, and clutch operating mechanism connected to be operated by said worm in its movement in an axial direction.

6. A shaft, a worm wheel secured thereto, a shaft movable longitudinally, a worm secured thereto and meshing with said worm wheel, driving mechanism for said longitudinally movable shaft, said mechanism including clutch members, and a lever connected at one end with one of said clutch members, and at its opposite end with the longitudinally movable shaft to be operated thereby.

7. A variable speed driving mechanism, including a driving shaft and a driven shaft, a connection between said shafts for rotating the driven shaft at a certain speed, said connection including a clutch, a connection between said shafts for rotating the driven shaft at a different rate of speed, said connection including a clutch and one of said connections including intermeshing gears, one of which may move relatively to the other, means for yieldingly resisting said movement, means for operating one of said clutches, and means connected to be actuated by the relative movement of said gear to operate the other clutch.

8. A variable speed driving mechanism including a driving shaft and a driven shaft, a connection between said shafts for rotating the driven shaft at a certain speed, said connection including a clutch, a connection between said shafts for rotating the driven shaft at a different rate of speed, said connection including a clutch, one of said connections including intermeshing gears, one of which may be moved relatively with respect to the other, means for yieldingly resisting the relative movement of said gear, and means for operating each of said clutches, each of said clutch operating members being connected to be operated by the relative movement of said gear.

9. A variable speed driving mechanism, including a driving shaft and a driven shaft, a driving connection between said shafts for rotating the driven shaft at a certain speed, said connection including a clutch, a connection between said shafts for rotating the driven shaft at a different rate of speed, said connection including a clutch, and one of said connections including intermeshing gears, one of which is arranged to move relatively with respect to the other, means for yieldingly resisting said relative movement, and clutch operating means connected with one of the clutches to be operated by the relative movement of said gear, and clutch operating mechanism connected with the other clutch to be operated by the relative movement of said gear, and means to permit independent operation of the first mentioned clutch.

10. A variable speed driving mechanism, including a driving shaft and a driven shaft, a driving connection between said shafts for rotating the driven shaft at a certain rate of speed, said connection including a clutch, means for normally engaging the clutch members, a connection between said shafts for rotating the driven shaft at a different rate of speed, said connection including a clutch, means for forcing the clutch parts into normal engagement, said connections including intermeshing gears, one of which is movable relatively to the other, clutch operating members connected with each of said clutches, and means to disengage said clutch operating members by the relative movement of said gear.

11. A driving shaft, a driven shaft, a connection between said shafts including a clutch, means for forcing one of the clutch members in one direction, a lever connected with said clutch member to move it in an opposite direction, a cam to operate said lever, means to engage and hold said lever in one position, and a cam to disengage said holding means from said lever.

12. A driving shaft, a driven shaft, a connection between said shafts including a clutch, means for forcing one of the clutch members in one direction, a lever connected with said clutch member to move it in an opposite direction, a cam to operate said lever, a latch mounted on a pivot horizontally disposed and arranged to engage said lever to hold it in one position, and a cam to disengage said latch from said lever.

13. A driving shaft, a driven shaft, a connection between said shafts including a clutch, means for forcing the clutch parts normally into engagement, a lever connected with one of the clutch members to disengage them, a latch arranged to engage said lever and hold it with the clutch members disengaged, and a cam supporting member bearing a cam to operate said latch and another cam to operate said lever.

14. A driving shaft, a driven shaft, a connection between said shafts for rotating the latter at a certain rate of speed, a clutch included in said connection and employed to effect driving operation, means for intermittently disengaging said clutch members, a connection between said shafts for rotating the driving shaft at a rate of speed different from that above mentioned, a stop motion clutch included in said connection and arranged for operation by a stop motion mechanism, and with its members engaged in the normal operation of the machine, and stop motion mechanism connected to operate said stop motion clutch.

15. A driving shaft, a driven shaft, a connection between said shafts including intermeshing gears, one of which is arranged to move relatively to the other, a stop motion clutch included in said connection, and a stop motion mechanism arranged to be operated by the relative movement of said gear to actuate the clutch members.

16. A driving mechanism mounted in a frame and including a clutch to connect and disconnect parts of said mechanism, one of said clutch members being a flanged sleeve, a sliding bar mounted in the frame, a stop motion lever mounted on the frame and operatively connected with said bar, a block secured to said bar and having forks engaging the flange of said sleeve, and means for operating the stop motion lever.

17. A driving mechanism mounted in a frame and including a clutch to connect and disconnect parts, a sliding bar operatively connected to actuate said clutch, a member loosely mounted on the bar, a lever loosely engaged with the bar to operate it, a handle movably connected with the bar to engage said loosely mounted member, means to oppose movement of said loosely mounted member, and means to actuate said lever.

18. A driving mechanism mounted in a frame and including a clutch to connect and disconnect parts, a sliding bar operatively connected to actuate said clutch, a member loosely mounted on the bar, a lever pivotally connected with the bar and having a cam to engage said loosely mounted member, a lever mounted on the frame in engagement with said loosely mounted member, means for actuating the lever, and means for resisting movement of the lever against the pressure of said cam.

19. A driving shaft, a driven shaft, a connection between said shafts, including a clutch, a lever for operating said clutch, a second connection between said shafts and including a stop motion clutch, a member movably mounted and connected to operate said stop motion clutch, a bar secured to said movable member and engaged with said lever by a pin and slot connection to operate said lever when it is in one position, and a stop motion mechanism connected to operate said movable member.

20. A driving shaft, a driven shaft, a connection between said shafts, including clutch members with means for normally forcing the said members into engagement, a lever for forcing the clutch members apart, a second connection between said shafts and including a stop motion clutch having its members continuously engaged in the normal operation of the machine, one of said connections including intermeshing gears, one of which is relatively movable with respect to its meshing gear, a member movably mounted and connected to be operated by the relative movement of said gear, a bar connected with said movable member, and a pin and slot connection between said bar and said lever, and arranged to permit movement of the bar without actuating the lever when its clutch parts are disengaged, but to operate said lever when its clutch parts are engaged.

21. In a driving mechanism, a driving shaft, a driven shaft, a gear connection between said shafts including a gear movable in an axial direction by its intermeshing gear, means for yieldingly resisting the axial movement of said gear, and means connected with said axially movable gear to be operated thereby to stop movement of the operating parts.

WALTER B. PEARSON.
ERNEST R. SEWARD.

Witnesses as to the signature of Walter B. Pearson:
W. E. COOPER,
EDWIN H. EHRMAN.

Witnesses as to the signature of Ernest R. Seward:
NELL M. DUERST,
PATRICIA OSBORNE.

Copies of this patent may be obtained for five cents each, by addressing the "Commissioner of Patents, Washington, D. C."